United States Patent [19]

Tseng

[11] Patent Number: 4,498,168
[45] Date of Patent: Feb. 5, 1985

[54] COMMUNICATION NETWORK AND METHOD FOR ITS USE

[75] Inventor: Chong-Wei W. Tseng, Santa Monica, Calif.

[73] Assignee: TRW Inc., Redondo Beach, Calif.

[21] Appl. No.: 449,083

[22] Filed: Dec. 13, 1982

[51] Int. Cl.³ .............................................. H04J 3/00
[52] U.S. Cl. ..................................... 370/85; 370/86; 370/88
[58] Field of Search ........................ 370/85, 86, 88, 4

[56] References Cited

U.S. PATENT DOCUMENTS 4,210,780  7/1980  Hopkins et al. ..................... 370/86

OTHER PUBLICATIONS

"The Express-Net: A Local Area Communication Network Integrating Voice and Data", International Conference on Data Communication Systems, L. Fratta et al., Paris, Sep. 1981.
"C-Net, A Local Broadcast Communication Network Architecture", Istituto di Elettronica e Telecomunicazioni Politecnico di Torino, Marsan et al., Apr. 1981.
"Ethernet: Distributed Packet Switching for Local Switching Networks", by R. M. Metcalfe et al., Comm. of the ACM, Jul. 1976.

Primary Examiner—Douglas W. Olms
Assistant Examiner—Kenneth I. Rokoff
Attorney, Agent, or Firm—Noel F. Heal; Donald R. Nyhagen

[57] ABSTRACT

A local communication network for interconnecting data transmitting and receiving stations, such as computers. A number of stations are connected for transmission of data onto an outbound unidirectional bus and are connected to receive data from an inbound bus in series with the outbound one. A "locomotive" generator transmits locomotives onto the outbound bus, and each station, if ready to transmit, adds a packet of data to the next passing "train" led by a locomotive. The resulting efficiency is relatively high and the network delay is relatively low, these figures being even further improved by the use of multiple locomotive generators or a regular-interval locomotive generator. Other embodiments employ an open-ring configuration, and a star coupler to minimize inbound losses.

18 Claims, 11 Drawing Figures

BYPASS LINE $T_{LG}(R_{LG})$: TRANSMITTING (RECEIVING) TAP OF LOCOMOTIVE GENERATOR
$T_i(R_i)$: TRANSMITTING (RECEIVING) TAP OF STATION $i$

COMMUNICATION NETWORK AND METHOD FOR ITS USE

BACKGROUND OF THE INVENTION

This invention relates generally to local area communication networks, and, more particularly, to such networks employing a unidirectional bus or ring to connect together a number of data communication devices, such as computers. In some types of communications systems, it is desirable to be able to transmit data from one computer to selected other computers. Providing a dedicated communication link between each unique pair of computers is obviously a costly and impractical solution, and various configurations of bus or ring networks have been developed to allow any computer connected to the network to "broadcast" a message to one or more of the other connected computers. The configurations for such networks available prior to this invention suffer from various drawbacks that limit their performance or increase their complexity and cost.

In a ring network, each of the computer stations is connected to transmission medium in the form of a closed ring. In this and the other systems to be discussed the transmission medium may be a coaxial cable to carry a modulated carrier signal at a selected radio frequency, or may be an optical communications link carrying a modulated light beam. The principles of the invention apply equally well to both types of systems, but for very high-speed communication optical transmission may be the preferred embodiment of the invention.

Transmission onto a ring network is always made in the same direction. Typically, when a station is ready to transmit data it waits until it senses a passing "token", an artifact of the data moving around the ring, that indicates that transmission of more data is permissible. The station then transmits its "packet" of data.

Typical ring networks have been discussed in the following technical publications: M. V. Wilkes et al., "The Cambridge Digital Communication Ring", Proc. Local Comm. Network Symposium, May 1979, pp. 47–61; D. C. Loomis, "Ring Communication Protocols," Univ. of California , Dept. of Information & Computer Science, Irvine, CA, Tech. Rep. 26, Jan. 1973; and M. T. Liu et al., "Message Communication Protocol and Operation System Design for the Distributed Loop Computer Network "DLCN", Proc. 4th Annu. Symp. Computer Architecture, pp. 193–200, Mar. 1977.

The basic problem with closed-ring networks is that each station must remove packets addressed to it or transmitted by it. Otherwise, the packets will circulate endlessly. Examining each packet to determine if removal is appropriate takes processing time at each station, and delays progress of data packets around the ring. This propagation delay increases linearly with the number of stations in the network, and represents a significant disadvantage of ring systems in general.

A significant development in the field of bus networks was a system known as Ethernet, first described by R. M. Metcalfe et al. in a paper entitled "Ethernet: Distributed Packet Switching for Local Switching Networks," Comm. of the ACM, July 1976, pp. 395–404. Its fiber optics version, Fibernet, is described by E. G. Rawson and R. M. Metcalfe in "Fibernet: Multimode Optical Fibers for Local Computer Networks," IEEE Trans. on Communications, July 1978, pp. 983–90. Ethernet and Fibernet have the principal disadvantage that a station may have to wait for an indefinite time to transmit a packet of data, because of possible repeated collisions with other packets accessing the bus simultaneously. In the worst case, if a collision is encountered upon each transmission attempt, the network delay time is infinite. This possibility of an unbounded network delay renders Ethernet and Fibernet unsuitable for real-time data communication. Moreover, as the data rate of the transmission medium increases, the efficiency (or maximal throughput) of these systems decreases.

Two further developments, using a unidirectional bus, are known as Express-net and C-net, both of which are discussed in the detailed description that follows in this specification. Express-net is described in a paper presented by L. Fratta et al., entitled "The Express-Net: A Local Area Communication Network Integrating Voice and Data," at the International Conference on Data Communication Systems: Performance and Applications, Paris, Sept. 1981. Briefly, when an Express-net station is ready to transmit a packet it waits until it senses a passing "train" of data packets, then adds its own packet to the end of the train. A data train is a series of data packets, each originating from a station, and is led by a "locomotive," which is simply a burst of an unmodulated carrier signal. This will be discussed in more detail below. Express-net has a relatively high efficiency and a relatively low bounded network delay, making it suitable for real-time communication. However, the superposition of the locomotives from the stations may result in a large signal dynamic range which makes the receiver design difficult, especially for the applications in optical networks. Moreover, when starting the system from a completely idle condition a special "cold start" procedure is to be followed.

The C-net configuration, also to be discussed in more detail, avoids the necessity of a cold start procedure, and somewhat simplifies the communication protocols of Express-net. However, the maximum network delay of C-net is almost double that of Express-net.

Another problem in both Express-net and C-net arises from their specific protocols. There is an outbound bus along which data packets are transmitted, the end of this bus being folded back to form an inbound bus, which is monitored by receivers at each of the stations. The receivers of the stations have to be linked in sequence along the inbound bus, to sequentially detect the end-of-train condition, which is used to coordinate the subsequent packet transmissions. The received signal strength is therefore progressively attenuated, especially in the case of networks using optical fibers, as a data train passes successive receivers. To avoid this difficulty, additional station equipment is needed to boost the signal at each station along the inbound bus.

It will be appreciated from the foregoing that there is still a need for a communication network having high efficiency, low and bounded network delay, and relative simplicity of protocol. Ideally, such a network should also be readily adaptable for use in networks of various sizes, while retaining its high efficiency and providing relatively uniform received signal strengths at each station's receiver. The present invention is directed to these ends.

SUMMARY OF THE INVENTION

The present invention resides in a data communication network having the efficiency and bounded network delay of prior networks, such as the Express-net, but having considerably reduced complexity and other important advantages. As in the C-net configuration, there is an outbound bus and an inbound bus to which all the stations are connected.

The key to achieving the objective of high efficiency and low bounded network delay is the inclusion of a locomotive generator, which is operative to transmit a locomotive or data train preamble, such as a short burst of an unmodulated carrier signal, along the outbound bus. Each station connected to the network, if ready to transmit data, does so by "attaching" a data packet to the end of the next passing data train, which may consist of just a locomotive, or a locomotive followed by one or more data packets from stations located upstream on the outbound bus. Each station also operates as a receiver, examining the data packets as they pass along the inbound bus.

Briefly, and in general terms, the network of the invention comprises a unidirectional data bus, including an outbound bus and an inbound bus connected in series, bus termination means at opposing ends of the unidirectional bus, and a plurality of data stations connected to the outbound and inbound buses.

Each station includes data transmitting means coupled to the outbound bus, for transmitting packets of data onto the outbound bus, sensing means also coupled to the outbound bus, for detecting the transmission of data packets on the outbound bus from upstream stations, data receiving means coupled to the inbound bus, for receiving data addressed to the data station, and station control means, for initiating transmission of a packet of data upon detection of a cessation of data transmission from a station upstream on the outbound bus.

Importantly, the network configuration also includes locomotive generation means, having transmitting means for generating a locomotive or data train preamble and transmitting it along the outbound bus, receiving means coupled to the inbound bus, for detecting the end of a data train passing along the inbound bus, and locomotive generation control means, for generation of a locomotive upon the detection of an end-of-train condition by the locomotive generation receiving means.

In terms of a novel method, the invention comprises the steps of transmitting locomotives onto the outbound bus in accordance with a locomotive spacing rule, adding a packet of data to the next passing train on the outbound bus, whenever a station has a packet to transmit, and receiving packets of data from the inbound bus. In one embodiment, the step of transmitting locomotives includes detecting an end-of-train condition on the inbound bus, and initiating transmission of a next locomotive in response to the detecting step. In another embodiment, the step of transmitting locomotives includes waiting for a predetermined time interval between locomotive transmissions.

In networks of usual size, the locomotive generation means can be a single generator connected to the outbound bus upstream of the first station, and to the inbound bus downsteam of the same station. As the size of the network increases, however, so does the spacing between trains and so does the network delay. There could also be a corresponding drop in transmission efficiency. Two alternative embodiments of the invention overcome this drawback.

In one embodiment, multiple locomotive generators are employed to utilize the time between trains from a single generator. For example, a second locomotive generator can generate locomotives that will lead trains timed to run between consecutive trains led by a first locomotive generator. In another embodiment, an alternative technique is to use a single locomotive generator, but to have it operate at regular timed intervals, corresponding to the time that a train of maximum length takes to pass a fixed point on the bus. This provides a maximum efficiency of approximately 100%.

Another advantage of the invention is that it may be connected in an "open-ring" configuration In this configuration, each station acts as a repeater, and the resulting data trains on the outbound bus are relatively uniform in signal strength. There is no accumulation of data on the open ring, because each data train is ultimately absorbed at a bus terminator. Thus, there is no need to process data at each station to determine the appropriateness of removal of a packet. The repeater can be made fail-safe; that is it becomes a short circuit when the associated station is out of service. Network reliability is thus greatly enhanced. The same approach could be extended to the inbound bus, but another configuration renders this extension unnecessary.

A limitation of the prior art is that the receiver of each station has to perform a detection function as well as a receiver function. Each receiver in an Express-net or C-net configuration has to detect an end-of-train condition, which is used to control subsequent transmissions by the station. In the present invention, however, only the locomotive generator has to detect the end-of-train condition. The receivers perform a receiving function exclusively, and play no part in controlling subsequent transmissions. In another embodiment of the invention, the inbound bus is replaced by a star coupler. In this arrangement, cumulative losses by connection to multiple receivers are avoided, and each station receives a uniform data signal of relatively high strength.

In an alternative embodiment of the invention, the embodiment in which there is a repeater at each station on the outbound bus is further modified. A bypass line is inserted at each station, in parallel with the path through the station acting as a repeater. The bypass line has no effect on the signal transmitted by the station, since the signal level of the station transmission is much higher than that on the bypass line. However, if a station is out of service for some reason, the bypass line lets signals from upstream bypass the station and allows continued operation of the network. Network reliability is also enhanced by this method. Even if a few stations fail completely, the network can continue to provide communications among the remaining stations.

it will be appreciated from the foregoing that the present invention represents a significant advance in the field of communication networks. In particular, the invention provides a communication network with a transmission efficiency at least as high, and a network delay as low, as in prior art systems, but with a communication protocol that is substantially reduced in complexity. In addition, the network of the invention may be connected in configurations not possible with prior-art techniques. Other aspects and advantages of the invention will become apparent from the following more detailed description, taken in conjunction with the accompanying drawings.

BRIEF DESCRIPTION OF THE DRAWINGS

FIG. 8b is a timing diagram relevant to the embodiment of FIG. 8a;

DESCRIPTION OF THE PREFERRED EMBODIMENTS

Figure 1:
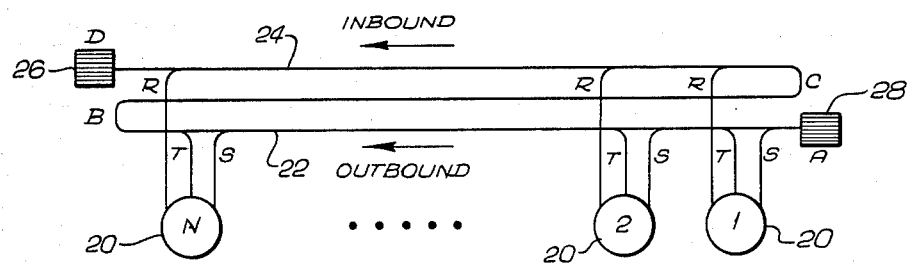
FIGS. 1 and 2 are diagrammatic views of two prior-art unidirectional communications networks.

As shown in the drawings for purposes of illustration, the present invention is concerned with improvements in communication networks for connecting a number of transmitting and receiving stations. Typically, the stations include computers, and the data to be transmitted is in digital form. Networks for connecting stations for the exchange of data usually include a data bus to which all the stations are coupled, and some means for avoiding conflict for usage of the bus.

The bus may take the form of a coaxial cable or other hard-wired link, or may be a light transmission medium, such as a fiber or a bundle of fibers, along which a modulated light beam is transmitted. For high rates of data transmission, the optical transmission technique will be the most likely choice. The present invention, although developed primarily as an optical communication technique, is not limited to this approach.

So that advantages of the invention can be best understood, the most closely related techniques of the prior art will be first discussed. FIG. 1 shows a typical configuration of a network known as Express-net. This network includes N stations, referred to by reference numeral 20 and bearing the numerals 1-N, respectively, an outbound bus 22, and an inbound bus 24. Each station 20 has a sensor, indicated by the letter S, that allows sensing of transmissions emanating further "upsteam" on the outbound bus 22, that is, from a lower-numbered station. However, a station cannot sense its own transmissions, nor those of downstream stations.

Each station 20 also has a transmitter S and a receiver R. The transmitter sends only in the "downstream" direction on the outbound bus 22, that is toward higher-numbered stations.

The outbound bus 22 is folded back on itself to connect to the station receivers in the same numerical sequence, starting with station #1, and continuing along the inbound bus 24. After connecting to the receiver R of station #N, the inbound bus is terminated in an absorbing terminator 26. In an optical system, the terminator 26 is non-reflective and virtually absorbs or dissipates the transmitted data. A similar terminator 28 is connected to the free end of the outgoing bus 22. In a system employing coaxial cables, the buses 22 and 24 may be terminated in their characteristic impedances, so that there is no reflection of the transmissions on the buses.

Data transmissions are typically made in "packets" of data. A data packet is merely a burst of data, and comprising a carrier signal that is modulated by binary data to be transmitted. Various modulation techniques may be used, none of which is critical to the invention. Basically, the sensor S at each station 20 can detect the presence or absence of the carrier signal transmitted from upstream on the outgoing bus 22, and this governs the operation of the transmitter T in the Expreess-net and other systems to be described.

The Express-net system of FIG. 1 operates by having each station that is ready to transmit a data packet initiate transmission when a "train" packet has just passed the station, as determined when its sensor S detects an end-of-carrier condition. For example, station #2 may add a packet behind the one transmitted by station #1, and station #3 may add a third packet. If a station begins transmitting and then senses a carrier signal, it aborts its transmission and waits until the carrier signal falls again. Thus, the train grows as it proceeds along the outbound bus 22.

In accordance with the Express-net protocol, in this example station #1 is not permitted to transmit again until the entire train passes the receiver R of station #1. Detection of end-of-train at receiver R of any station has the effect of enabling its sensor S to find end-of-carrier again. If the network is lightly loaded, it may happen that all stations that become ready to transmit packets after an idle period may not find the end-of-carrier condition and could then never transmit their packets. For this reason, every station that detects an end-of-train at its receiver R is required to transmit a burst of an unmodulated carrier signal, referred to as a "locomotive," regardless of whether it has a packet to transmit. As the end-of-train progresses past the receivers, each "live" station will generate a locomotive. The end-of-train will reach tap R of station #i at the same time that a locomotive from station #1 reaches tap T of station #i. Thus, a locomotive generated by station #i will coincide with one arriving from station #1. The superposition of these locomotives may result in a large signal dynamic range, which makes the design of the receivers difficult, especially for the applications in optical networks.

A special problem may arise when a station first becomes "alive," such as after being repaired or serviced. It first determines whether any other station is alive, by waiting for a predetermined time period to see if the train arrives at its receiver R. If no such train is detected in that time period, that network is presumably "dead," and a special "cold start" procedure is to be followed, to ensure that, even if executed by more than one station, a conflict-free start-up will result. For a cold start, the station transmits a continuous unmodulated carrier signal until the carrier is detected at its receiver. Then the station sends a locomotive and continues to act like a "live" station.

The transmission efficiency E is defined as the ratio of the time in a train spend for data transmission, to the time spacing between consecutive locomotives under a heavy load condition. For the Express-net, the efficiency is given by:

$$E_E = \frac{N \times T_p}{N(T_p + t_d) + (\tau + \tau_c + t_d)} \quad (1)$$

where

N = the number of stations,
$T_p$ = the packet transmission time,
$t_d$ = the time needed to detect a signal (hence the time between packets),
$\tau$ = the propagation delay along the outbound or the inbound bus, and
$\tau_c$ = the propagation delay in the connector between the outbound and inbound buses.

The first expression in the denominator is the train length, or more precisely the time it takes for a train to pass a fixed point, and the second expression represents the time spacing from the end of one train to the beginning of the next. The length of the locomotive has been neglected, for simplicity, in deriving equation (1).

The maximal network delay, which is defined as the time period between two consecutive packets from a station, which is equal to the time period measured from the start of one train to the start of the next is:

$$D_E = N(T_p + t_d) + (\tau + \tau_c + t_d) \qquad (2)$$

This delay can never be exceeded, because of the protocol that a new locomotive is generated as soon as end-of-train reaches the station receiver. Since the network delay has a fixed upper bound, the system is suitable for real-time communication.

Figure 2:
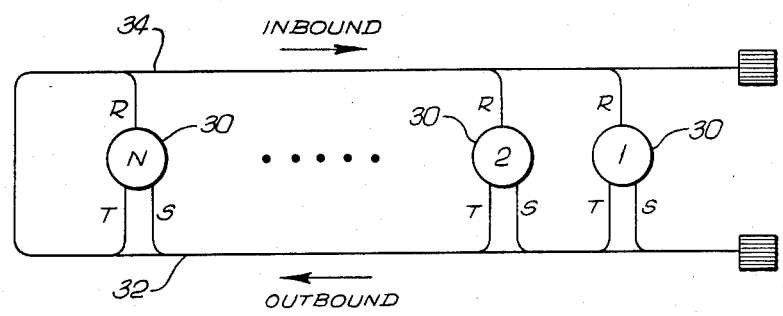

The protocols associated with Express-net are quite complicated and represent a significant disadvantage, which is to some degree avoided in a network known as C-net, shown diagrammatically in FIG. 2. Again there are N stations 30, an outbound bus 32, and an inbound bus 34 connected in series with the outbound bus. Thus the outbound bus 32 is connected to sensors S and transmitters T of stations #1 through #N; then the inbound bus 34 is connected sequentially to receivers R of stations #N through #1.

In the C-net, a station is allowed to sense carrier only after detecting the end-of-train condition at its receiver R, for the train containing the station's transmitted packet. When the station senses no-carrier, rather than end-of-carrier, at its sensor S, it can transmit a packet. This protocol avoids Express-net's cold-start difficulties, since a no-carrier condition permits a station to transmit without further delay. However, the possibility of "collisions" between data packets is quite high. If a station detects a collision after starting transmission, it aborts the operation and waits for the next no-carrier condition.

The transmission efficiency of C-net is:

$$E_C = \frac{NT_p}{N(T_p + t_d) + 2(\tau + t_d)} \qquad (3)$$

where the symbols have the same meanings as in equation (1). The efficiency of C-net is, therefore, approximately the same as that of Express-net.

The maximum network delay for C-net, however, is much higher than that of Express-net. The maximum network delay arises, as one of the worst cases, when station #N begins and almost finishes transmission, but stops upon sensing a transmission from station #(N-1). Station #N tries again but is interrupted by a transmission from station #(N-2), and so on. Station #N thus aborts (N-1) transmissions before successfully transmitting. The maximum network delay is given by:

$$D_C = (2N - 1)T_p + (N - 1)t_d + 2\tau \qquad (4)$$

This is approximately twice the bounded network delay for the Express-net, given in equation (2).

Figure 3:
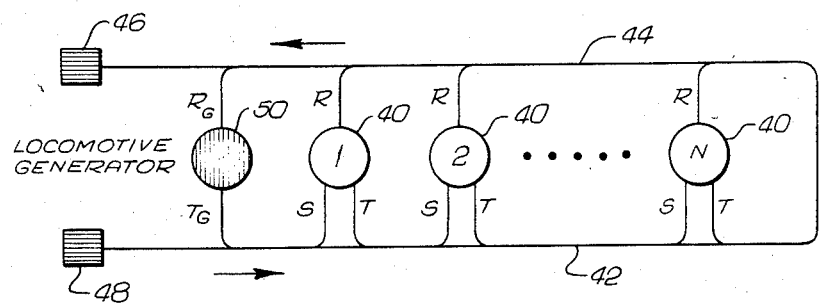
FIG. 3 is a diagrammatic view of the network of the present invention.

In accordance with the invention, approximately the same or better efficiency and network delay as Express-net are obtained in a network having protocols of substantially less complexity. As shown in FIG. 3, the network of the invention, which may be conveniently referred to as D-net, comprises a plurality of stations 40, each with a sensor S, a transmitter T and receiver R, an outbound bus 42, and an inbound bus 44 connected to the outbound bus in the same manner as in the C-net. There are also bus terminators 46 and 48. As usual, each sensor S and transmitter T is connected to the outbound bus 42, and each receiver R is connected to the inbound bus 44.

Figure 7:
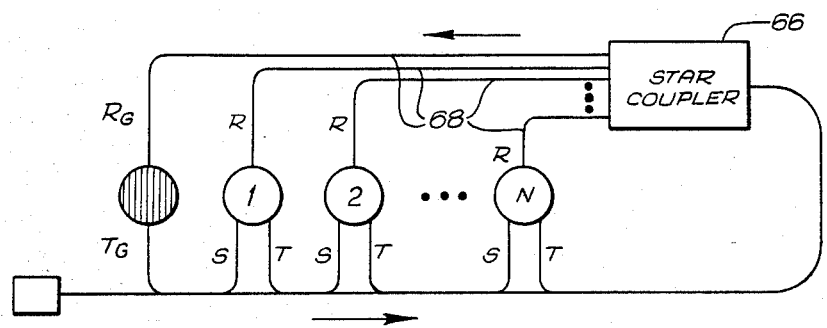
FIG. 7 is a diagrammatic view of a third embodiment of the invention.

One of the key difference between the prior art and the network of the invention lies in the inclusion of a locomotive generator 50, having a transmitter $T_G$ connected to the outbound bus 42 upstream of station #1, and a receiver $R_G$ connected to the inbound bus 44 downstream of station #1. The sole function of the locomotive generator 50 is to generate locomotives to which the stations 40 can append their data packets. The only criterion for each station to determine whether transmission may begin is the sensing of an end-of-carrier condition on the outbound bus. In effect, each station that is ready to transmit a packet appends it to the next passing train. The receivers R perform only a message-receiving function and do not need to look for an end-of-train condition. This is another key difference between this invention and the prior art. As will be seen, this difference leads to a unique and desirable embodiment of the invention, as shown in FIG. 7.

Figure 5:
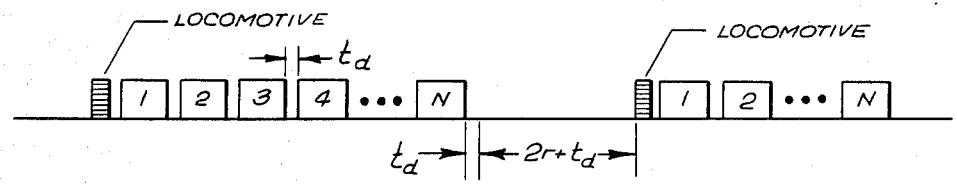
FIG. 5 is a timing diagram showing a series of data trains under a heavy-load condition.

The locomotive generator 50 may be operated in one of at least two different modes. In its basic mode of operation, the locomotive generator 50 senses end-of-train at its receiver $R_G$, and then transmits another locomotive onto the outbound bus 42. FIG. 5 shows two data trains under a heavy load condition, with N packets in each train. A packet from station #N takes a delay of $\tau$ to reach the station locomotive generator receiver, then a new locomotive takes an additional time $\tau$ to reach station #N again. Hence the spacing between trains is approximately $2\tau$, if the time to detect a signal is ignored.

The transmission efficiency is given by:

$$E_D = \frac{NT_p}{N(T_p + t_d) + 2\tau + t_d} \qquad (5)$$

This is the same as the efficiency $E_E$ for Express-net if $\tau = \tau_c$. The bounded network delay is given by:

$$D_D = N(T_p + t_d + 2\tau + t_d = D_E = \tfrac{1}{2}D_C \qquad (6)$$

In spite of the protocol simplicity of D-net, the efficiency and network delay are approximately the same as those of the Express-net. Importantly, the network delay is only half that of C-net.

In situations in which N is small and $NT_p$ is not much greater than $2\tau$, a significant improvement in both efficiency and maximal network delay is obtained by modifying the locomotive generator 50 to operate at regular intervals rather than waiting for end-of-train at its receiver. Basically, a new locomotive is transmitted after an interval corresponding to the length of a fully-loaded train.

Figure 10:
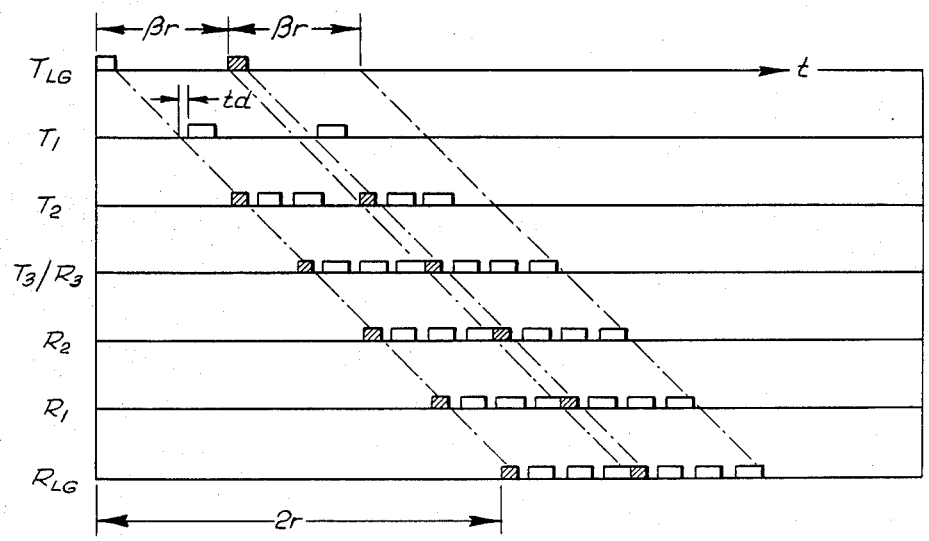
FIG. 10 is a timing diagram showing operation of the invention for maximum efficiency.

In FIG. 10, the locomotive transmission interval is set to $\beta\tau$, where $\beta$ is a positive factor and $\beta\tau$ is equal to $NT_p$ (neglecting locomotive length and signal detection time). We see that the maximal network delay is given by $NT_p$; and for fully loaded trains the transmission efficiency approaches 100%.

Figure 4:
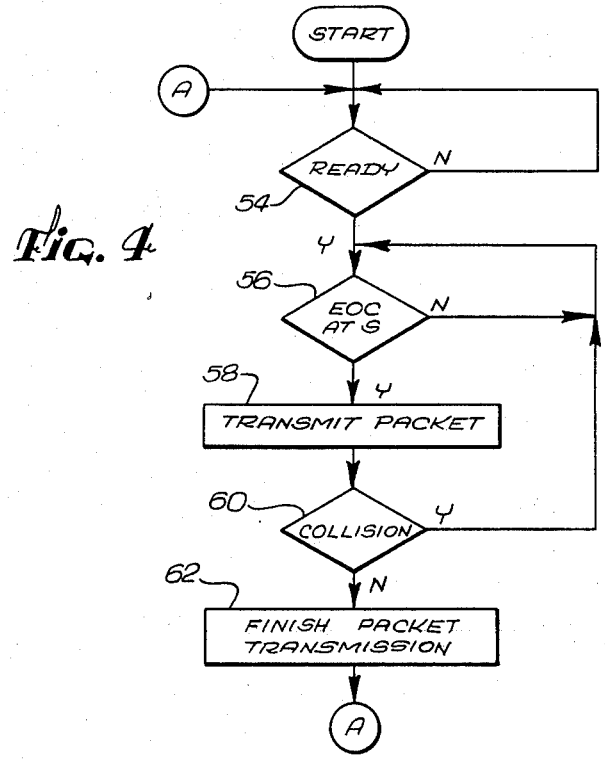
FIG. 4 is a flow chart showing network access protocol for a station connected to the FIG. 3 network.

FIG. 4 shows the functions performed at each station by control circuitry connected to the outbound bus 42. First, a check is made to see if the station is ready to send a data packet, as indicated at 54. If not, the question is continually posed until an affirmative response is obtained. Then, the sensor S checks for an end-of-carrier event, as shown at 56, and waits until the event occurs at that moment transmission of a packet of data is initiated, as shown at 58. While the packet is being transmitted, the sensor S checks for a renewed carrier signal, as shown at 60, which would indicate a collision of data packets. In the event of a collision, control is transferred back to block 56 to check for the next end-of-carrier event. If there is no collision, transmission of the packet is completed, as indicated at 62, and control transfers back to block 54, to wait for a new data packet to be ready.

Figure 6:
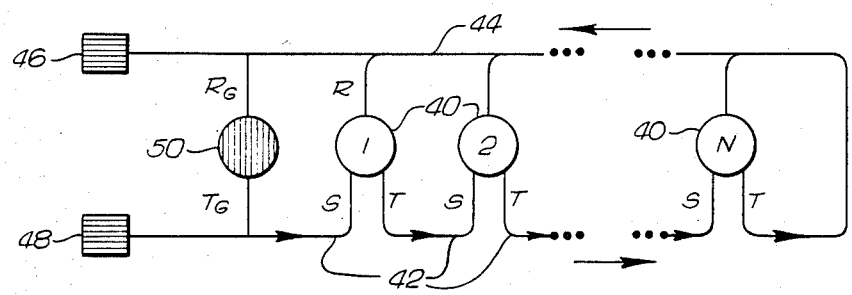
FIG. 6 is a diagrammatic view of a second embodiment of the invention.

A different version of the new network is shown in FIG. 6. In this configuration, the outbound bus 42 is not an uninterrupted bus. Instead, each station's sensor S and transmitter T form part of the bus, and each station operates as a repeater when it is not transmitting its own packets of data. The repeater can be designed to become a short circuit when the associated station is out of service. In this manner, uniformity of signal strength can be maintained throughout a train as it advances along the outbound bus 42, and the repeater is fail-safe.

Figure 9:
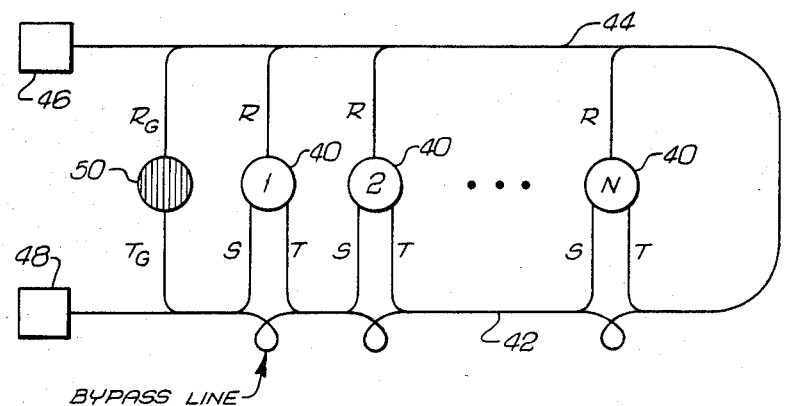
FIG. 9 is a diagrammatic view showing a further improvement over the embodiment of FIG. 6.

In the embodiment of FIG. 9, the stations also act as repeaters, but instead of making the repeater fail-safe, there is a bypass line providing a parallel bypass between the S and T terminals of each station. The signal level through the bypass line is much lower than that from a repeater. Therefore, when a station is working, the signals through the bypass line are effectively superseded by those from the station. This configuration also has the advantage that a few stations can be deactivated and removed without seriously affecting operation of the network.

Another useful configuration is shown in FIG. 7. Since the station receivers R no longer perform a detection and timing function, they need not be chained sequentially to the inbound bus. A star coupler 66 splits signals from the outbound bus 44 into $N+1$ equal-power portions, and separate channels 68 couple the divided signals to the stations and the locomotive generator 50. The receivers R receive signals of equal strength, and the cumulative losses along the inbound bus are eliminated.

Figure 8A:
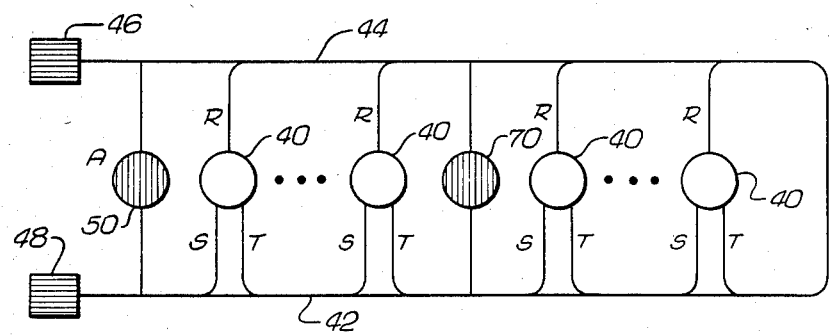
FIG. 8a is a diagrammatic view of a fourth embodiment of the invention.
Figure 8B:
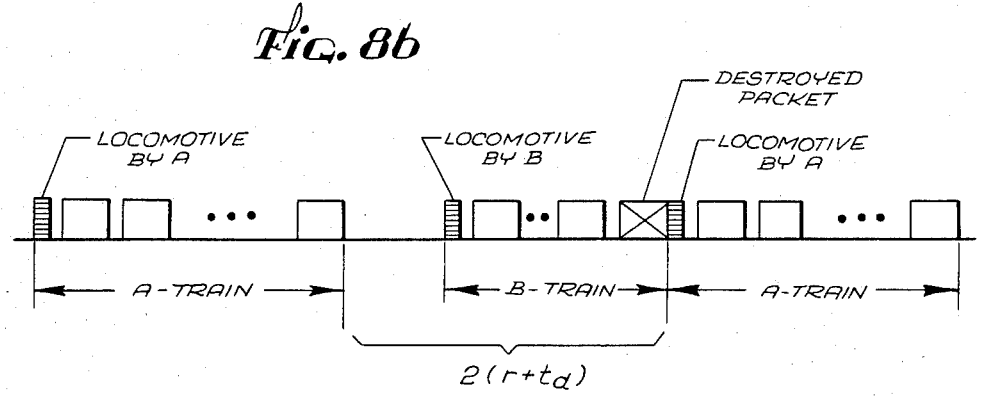

Finally, FIG. 8a shows another technique for improving efficiency, by installing a second locomotive generator 70, located near the mid-point of the outbound and inbound buses 42 and 44. Locomotives from the two generators can be distinguished from each other by coding them differently, and any appropriate protocol applied to control generation of locomotives to best fill the time available on the buses. Although the multiple locomotive generator configuration is a useful solution in some instances, it does nothing to improve throughput as viewed from the stations before the second generator.

It will be appreciated from the foregoing that the present invention represents a significant advance in the field of communication networks for the interconnection of transmitter/receiver stations, such as computers. In particular, the invention provides a network configuration having a high transmission efficiency, a low bounded network delay, and an extremely simple operational protocol. It will also be appreciated that, although specific embodiments of the invention have been described in detail for purposes of illustration, various modifications may be made, such as by combining the described features, without departing from the spirit and scope of the invention. Accordingly, the invention is not to be limited except as by the appended claims.

I claim:

1. A data communications network, comprising:
    a unidirectional data bus, including an outbound bus and an inbound bus connected in series, and bus temination means at opposing ends of said unidirectional bus;
    a plurality of data stations, each having data transmitting means coupled to said outbound bus, for transmitting packets of data onto said outbound bus, sensing means also coupled to said outbound bus, for detecting the transmission of a data packet on said outbound bus from an upstream station, data receiving means coupled to said inbound bus, for receiving data addressed to the data station, and station control means, for transmitting a packet of data upon detection of a cessation of data transmission from stations upstream on said outbound bus; and
    locomotive generator means, not part of any of said data stations, and having transmitting means for generating a data train preamble and transmitting it along said outbound bus, and locomotive generator control means, for initializing generation of new data train preambles in accordance with a predefined plan;
    whereby each of said stations, if ready to transmit data, adds a data packet to the next passing data train upon sensing cessation of data transmission on said outbound bus, whereby each of said stations receives data packets designated to it from said inbound bus, and whereby each data train passes along said outbound bus and said inbound bus, before being absorbed by said bus termination means.

2. A data communications network as set forth in claim 1, wherein:
    said outbound bus passes through said sensing means and said transmitting means of each of said data stations, which function both to transmit additional packets of data when required, and to boost the signal strength of transmissions on said outbound bus, whereby a substantially uniform signal strength is maintained in each data train as it advances along said outbound bus.

3. A data communications network as set forth in claim 2, wherein:
    said outbound bus includes a plurality of bypass lines connected to bypass each of said stations between said sensing means and said transmitting means to provide continuity of said outbound bus in the event that one or more of said stations is out of service.

4. A data communications network as set forth in claim 1, wherein:

said locomotive generator means includes a plurality of locomotive generators spaced apart along said outbound bus and said inbound bus, among but not part of said data stations; and said locomotive generators are operative to generate new locomotives according to a set of predetermined rules.

5. A data communications network, comprising:

an outbound unidirectional bus;

a plurality of data stations, each having data transmitting means coupled to said outbound bus, for transmitting packets of data onto said outbound bus, sensing means also coupled to said outbound bus, for detecting the transmission of a data packet on said outbound bus from an upstream station, data receiving means for receiving data addressed to the data station, and station control means, for transmitting a packet of data upon detection of a cessation of data transmission from stations upstream on said outbound bus;

locomotive generator means, not part of any of said data stations, and having transmitting means for generating a data train preamble and transmitting it along said outbound bus, and locomotive generator control means, for initializing generation of a new train preamble in accordance with a predefined plan; and star coupler means having an input port connected to receive data transmissions from said outbound bus and a plurality of output ports connected to distribute the received data transmissions in approximately equal-power proportions to said receiving means of said data stations and said locomotive generator means;

whereby means of said data stations; if ready to transmit data, adds a data packet to the next passing data train upon sensing cessation of data transmission on said outbound bus, and whereby each data train passes along said outbound bus and said star coupler means, before being absorbed by said receiving means and said bus termination means.

6. A data communications network as set forth in claim 5 wherein:

said outbound bus passes through said sensing means and said transmitting means of each of said data stations, which function both to transmit additional packets of data when required, and to boost the signal strength of transmissions on said outbound bus, whereby a substantially uniform signal strength is maintained in each data train as it advances along said outbound bus.

7. A data communications network as set forth in claim 6, wherein:

said outbound bus includes a plurality of bypass lines to bypass each of said stations between said sensing means and said transmitting means, to provide continuity of said outbound bus in the event that one or more of said stations is out of service.

8. A data communications network as set forth in claim 5 wherein:

said locomotive generator means includes a plurality of locomotive generators spaced apart along said outbound bus, among but not part of any of said data stations; and said locomotive generators are operative to generate new locomotives according to a set of predetermined rules.

9. A method for transmitting packets of data among a plurality of data stations, each of which has a sensor for detecting the presence of a communications carrier signal, a transmitter for transmitting packets of data, and a receiver for receiving packets of data, said method comprising the steps of:

activating a locomotive generator that is separate from the data stations, to transmit a data train locomotive, in accordance with a predetermined locomotive spacing plan, onto an outbound bus that is connected to the sensors and transmitters of the stations, and is then connected to the receivers of the stations;

sensing an end-of-carrier condition at each station;

transmitting a packet of data onto the outbound bus in response to said sensing step;

aborting said transmitting step in response to renewed presence of a carrier signal from downstream on the outbound bus;

receiving data packets at the receivers of the stations; and determining at each receiver whether a message is intended for reception at the receiver's station, whereby the stations attach packets to passing data trains, for transmission to the receivers of all the stations, whereby the intended destination of each message is determined at each receiver.

10. A method as set forth in claim 9 wherein said step of activating a locomotive generator includes:

detecting an end-of-train event at a receiver terminal of the locomotive generator; and activating the locomotive generator in response to detection of the end-of-train event.

11. A method as set forth in claim 9 wherein:

said step of activating the locomotive generator is performed at regular timed intervals.

12. A method as set forth in claim 11, wherein:

said step of activating the locomotive generator is performed at intervals corresponding approximately to the time a fully loaded data train takes to pass a fixed point on the outbound bus.

13. A data communications network, comprising:

a unidirectional data bus, including an outbound bus and an inbound bus connected in series, and bus termination means at opposing ends of said undirectional bus;

a plurality of data stations, each having data transmitting means coupled to said outbound bus, for transmitting packets of data onto said outbound bus, sensing means also coupled to said outbound bus, for detecting the transmission of a data packet on said outbound bus from an upstream station, data receiving means coupled to said inbound bus, for receiving data addressed to the data station, and station control means, for transmitting a packet of data upon detection of a cessation of data transmission from stations upstream on said outbound bus; and locomotive generator means, having transmitting means for generating a data train preamble and transmitting it along said outbound bus, and locomotive generator control means, for initializing generation of new data train preambles in accordance with a predefined plan;

whereby each of said stations, if ready to transmit data, adds a data packet to the next passing data train upon sensing cessation of data transmission on said outbound bus, whereby each of said stations receives data packets designated to it from said inbound bus, and whereby each data train passes along said outbound bus and said inbound bus, before being absorbed by said bus termination means;

and wherein said locomotive generator means is a single locomotive generator located to generate locomotives upstream of the first of said data stations on said outbound bus, and having receiving means coupled to said inbound bus, to detect data trains arriving downstream of the same data station in said inbound bus, and said locomotive generator control means is operative to initiate generation of an additional locomotive in response to the detection of an end-of-train condition by said locomotive generator receiving means.

14. A data communications network, comprising:

a unidirectional data bus, including an outbound bus and an inbound bus connected in series, and bus termination means at opposing ends of said unidirectional bus;

a plurality of data stations, each having data transmitting means coupled to said outbound bus, for transmitting packets of data onto said outbound bus, sensing means also coupled to said outbound bus, for detecting the transmission of a data packet on said outbound bus from an upstream station, data receiving means coupled to said inbound bus, for receiving data addressed to the data station, and station control means, for transmitting a packet of data upon detection of a cessation of data transmission from stations upstream on said outbound bus; and locomotive generator means, having transmitting means for generating a data train preamble and transmitting it along said outbound bus, and locomotive generator control means, for initializing generation of new data train preambles in accordance with a predefined plan;

whereby each of said stations, if ready to transmit data, adds a data packet to the next passing data train upon sensing cessation of data transmission on said outbound bus, whereby each of said stations receives data packets designated to it from said inbound bus, and whereby each data train passes along said outbound bus and said inbound bus, before being absorbed by said bus termination means;

and wherein said locomotive generator means is a single locomotive generator located to generate locomotives upstream of the first of said data stations on said outbound bus, and said locomotive generator control means is operative to initiate generation of locomotives at uniformly spaced time intervals.

15. A data communications network as set forth in claim 14, wherein:

said locomotive generator control means is operative to generate locomotives at intervals equivalent to the time that a fully loaded data train takes to pass a fixed point on said unidirectional bus.

16. A data communications network, comprising:

an outbound unidirectional bus;

a plurality of data stations, each having data transmitting means coupled to said outbound bus, for transmitting packets of data onto said outbound bus, sensing means also coupled to said outbound bus, for detecting the transmission of a data packet on said outbound bus from an upstream station, data receiving means for receiving data addressed to the data station, and station control means, for transmitting a packet of data upon detection of a cessation of data transmission from stations upstream on said outbound bus;

locomotive generator means, having transmitting means for generating a data train preamble and transmitting it along said outbound bus, and locomotive generator control means, for initializing generation of a new train preamble in accordance with a predefined plan; and star coupler means having an input port connected to receive data transmissions from said outbound bus and a plurality of output ports connected to distribute the received data transmissions in approximately equal-power proportions to said receiving means of said data stations and said locomotive generator means;

whereby each of said stations, if ready to transmit data, adds a data packet to the next passing data train upon sensing cessation of data transmission on said outbound bus, and whereby each data train passes along said outbound bus and said star coupler means, before being absorbed by said receiving means and said bus termination means;

and wherein said locomotive generator means is a single locomotive generator located to generate locomotives upstream of the first of said data stations on said outbound bus, and having receiving means coupled to an output port of said star coupler means, to detect data trains arriving from said outbound bus; and said locomotive generator control means is operative to initiate generation of an additional locomotive in response to the detection of an end-of-train condition by said locomotive generator receiving means.

17. A data communications network, comprising:

an outbound unidirectional bus;

a plurality of data stations, each having data transmitting means coupled to said outbound bus, for transmitting packets of data onto said outbound bus, sensing means also coupled to said outbound bus, for detecting the transmision of a data packet on said outbound bus from an upstream station, data receiving means for receiving data addressed to the data station, and station control means, for transmitting a packet of data upon detection of a cessation of data transmission from stations upstream on said outbound bus;

locomotive generator means, having transmitting means for generating a data train preamble and transmitting it along said outbound bus, and locomotive generator control means, for initializing generation of a new train preamble in accordance with a predefined plan; and star coupler means having an input port connected to receive data transmissions from said outbound bus and a plurality of output ports connected to distribute the received data transmissions in approximately equal-power proportions to said receiving means of said data stations and said locomotive generator means;

whereby each of said stations, if ready to transmit data, adds a data packet to the next passing data train upon sensing cessation of data transmission on said outbound bus, and whereby each data train passes along said outbound bus and said star coupler means, before being absorbed by said receiving means and said bus termination means;

and wherein said locomotive generator means is a single locomotive generator located to generate locomotives upstream of the first of said data stations on said outbound bus, and said locomotive generator control means is operative to initiate generation of locomotives at uniformly spaced time intervals.

18. A data communications network as set forth in claim 17, wherein:

said locomotive generator control means is operative to generate locomotives at intervals equivalent to the time that a fully loaded data train takes to pass a fixed point on said unidirectional bus.

* * * * *

UNITED STATES PATENT AND TRADEMARK OFFICE
CERTIFICATE OF CORRECTION

PATENT NO. : 4,498,168

DATED : February 5, 1985

INVENTOR(S) : Chong-Wei W. Tseng

It is certified that error appears in the above-identified patent and that said Letters Patent is hereby corrected as shown below:

Column 4, line 52, delete "it" and insert --It--.

Column 6, line 60, delete "spend" and insert --spent--.

Column 7, line 7, delete "$\tau$" and insert --$\tau_c$--.

Signed and Sealed this

Eighth Day of April 1986

[SEAL]

Attest:

DONALD J. QUIGG

Attesting Officer

Commissioner of Patents and Trademarks